United States Patent Office 3,009,771
Patented Nov. 21, 1961

3,009,771
CHLORO-DIALUMINUM ZIRCONATES AND
METHOD OF MAKING THE SAME
Irvine W. Grote, Chattanooga, Tenn., assignor to The
Chattanooga Medicine Company, Chattanooga, Tenn.,
a corporation of Tennessee
No Drawing. Filed June 12, 1959, Ser. No. 819,808
12 Claims. (Cl. 23—85)

The present invention is concerned generally with the production of zirconium-aluminum compounds, and is more particularly directed to new complexes of zirconium, aluminum and chlorine and their methods of preparation.

This application is a continuation-in-part of my copending application, Serial No. 665,658, filed June 14, 1957.

The group of compounds of this invention has been found particularly effective as the active ingredient in deodorant and antiperspirant compositions, and reference will accordingly be made herein to this specific and important application. However, it is to be appreciated that the zirconium-aluminum salts described are not restricted to their use in the prevention or retardation of perspiration exudation.

The aluminum salts of strong acids, and particularly the chlorides and sulphates, have long been used in antiperspirant compositions; however, these compounds have the disadvantage of forming strongly acid solutions which have a tendency to irritate the skin and damage the clothing. While the use of the salts of relatively weak acids reduces the problems of skin irritation and clothing damage, such compounds are relatively ineffective in inhibiting perspiration flow.

The addition of zirconium compounds has recently been found to have some beneficial effect when used in conjunction with aluminum compounds in antiperspirant compositions. However, the use of zirconium oxychloride or its hydrate, as such, is not satisfactory because these compounds precipitate from solution when the pH rises above 2 or 2.1. In order to maintain zirconium in solution above this pH, it has been found necessary to react the zirconium compound with a chelating agent, normally consisting of an alpha-hydroxy or alpha-amino organic acid. A chelating agent frequently used is glycine, and one objection of this and other buffers is that they materially increase the cost of the antiperspirant composition.

It is accordingly an important aim of the present invention to provide water soluble zirconium-aluminum compounds which are highly stable and form essentially non-viscous solutions free of any gelling therein.

Another object of this invention lies in the provision of complexes of zirconium, aluminum and chlorine having atomic ratios for these elements, respectively, of 1:2:2, 3 or 4.

A further object of the invention is to provide a method for the synthesis of di-, tri-, and tetrachlorodialuminum zirconates.

The chloro-dialuminum zirconates of the present invention may be represented by the general formula:

$$ZrO.(AlO)_2.Cl_2.X_2$$

wherein each X is a monovalent radical selected from the group consisting of —Cl and —OH radicals.

Presently, at least three compounds of the above general formula are within the contemplation of this invention. One is dichloro dihydroxy dialuminum zirconate represented by the formula $ZrO.(AlO)_2.Cl_2.(OH)_2$, a second is trichloro monohydroxy dialuminum zirconate having the formula $ZrO.(AlO)_2.Cl_3.(OH)$, and a third is tetrachloro dialuminum zirconate having the empirical formula $ZrO.(AlO)_2.Cl_4$.

Each of the above identified compounds is produced by the reaction of zirconium oxychloride and an aluminum alkoxide, and with respect to the trichloro- and tetrachloro-compounds only, an additional reactant is hydrochloric acid. The zirconium oxychloride used in the examples to follow is the commercially available material represented by the formula $ZrO.Cl_2.8H_2O$. This compound generally contains about 0.5% to 2.0% by weight of hafnium, and it is within the contemplation of this invention that hafnium oxychloride be substituted in whole or in part for the zirconium compound.

The aluminum alkoxide employed is exemplified by aluminum isopropoxide or aluminum butyl alcoholate, and is preferably a compound in which the alcohol residue contains from one to 5 carbon atoms. In the equations to follow, R is accordingly a $C_1$–$C_5$ alkyl group.

The reaction of zirconium oxychloride with aluminum alkoxide to produce the chloro-dialuminum zirconates may be represented by the following equations:

$$ZrO.Cl_2 + 2Al(OR)_3 + 4H_2O$$
$$\rightarrow ZrO.(AlO)_2.Cl_2.(OH)_2 + 6ROH$$
$$ZrO.Cl_2 + Al(OR)_3 + 3H_2O + HCl$$
$$\rightarrow ZrO.(AlO)_2.Cl_3.(OH) + 6ROH$$
$$ZrO.Cl_2 + 2Al(OR)_3 + 2H_2O + 2HCl$$
$$\rightarrow ZrO.(AlO)_2.Cl_4 + 6ROH$$

In the initial reactions above, if the reaction temperature is not maintained relatively low, a gel may be formed. However, this can readily be substantially completely redissolved by boiling the solution. The solution may then be filtered either hot or cold, and the filtrate in each case is relatively clear. The dichloro-compound has a pH of about 3.65, the trichloro-compound a pH of about 3.50, and the tetrachloro-compound a pH of about 3.30 when in 10% (w./v.) solution.

A further description of the invention will be made in conjunction with the following specific examples:

Example I

To prepare dichloro dihydroxy dialuminum zirconate, 96.7 grams of purified zirconium oxychloride octahydrate (0.3 mole) was dissolved in 600 ml. of water. 122 g. of distilled aluminum isopropoxide (0.6 mole) was added slowly in liquid form to the solution with vigorous agitation. The resulting solution was distilled until the vapor temperature reached 100° C., indicating complete removal of the isopropyl alcohol. The solution was then diluted so that 100 ml. contained 10.0 g. of the compound [$ZrO.(AlO)_2.Cl_2.(OH)_2$], and the diluted solution was found to have a pH of 3.65.

Example II

To prepare trichloro monohydroxy dialuminum zirconate, 0.1 mole of purified zirconium oxychloride octahydrate was dissolved in 200 ml. of water, to which 0.1 mole of hydrochloric acid was added, and 0.2 mole of distilled aluminum isopropoxide in liquid form was added slowly to the solution with vigorous stirring. The mixture was boiled for five minutes to dissolve the lumps. The solution was filtered hot, cooled, and then diluted to yield a solution containing 10.0 g. of $$ZrO.(AlO)_2.Cl_3.(OH)$$

in each 100 ml. of solution. The pH of the diluted solution was about 3.50. The trichloro compound has the structural formula:

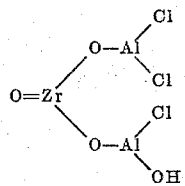

Example III

To prepare tetrachloro dialuminum zirconate, 96.7 g. of purified zirconium oxychloride octahydrate (0.3 mole) was dissolved in 300 ml. of water and 49 ml. of concentrated hydrochloric acid (0.6 mole) was added. 122 g. of distilled aluminum isopropoxide (0.6 mole) was added slowly in liquid form with vigorous agitation. The resulting solution was distilled to remove all isopropyl alcohol, and this solution was then diluted so that 100 ml. thereof contained 10.0 g. of the compound $ZrO.(AlO)_2.Cl_4$. The pH of the diluted solution was about 3.30.

To analyze the three resulting compounds, a chloride analysis was performed on each compound by the Volhard titration method, and zirconium was separated from aluminum and determined by precipitation as a phosphate and ignition to the pyrophosphate. Aluminum was separated from the zirconium as sodium aluminate and was determined by the 8-hydroxy-quinoline method. It was found that the atomic ratio of Zr:Al:Cl in the dichloro dihydroxy dialuminum zirconate was 1:2.02:1.94, which corresponds closely to the theoretical ratio 1:2:2. Trichloro monohydroxy dialuminum zirconate had an atomic ratio of 1:1.9:2.94, as contrasted with a theoretical ratio of 1:2:3. Tetrachloro dialuminum zirconate, on the other hand, had an atomic ratio for these elements of 1:1.95:3.91, which again corresponds closely to the theoretical ratio of 1:2:4.

To prove that dichloro dihydroxy dialuminum zirconate existed as a definite compound, the aqueous solution of Example I, prior to dilution for the pH determination, was dried at 30–40° C. until nearly dry, and then finally dried in a vacuum desiccator over calcium chloride for several days. Four test solutions were prepared, the first (solution 1 below) being made by dissolving approximately one gram of the dried material in distilled water and diluting to 100 ml. with water. The second solution (solution 2 below) was prepared by treating 10 g. of dried material with 10 ml. of distilled water. Not all of the material dissolved, and the solution was separated by vacuum filtration. Two to three ml. of filtrate were obtained, and the filtrate was then diluted to 50 ml. with water. The third test solution (solution 3 below) was prepared by adding a second 10 ml. portion of distilled water to the undissolved solid remaining from solution 2, and by repeating the separation. The filtrate (about 10 ml.) was diluted to 50 ml. with water. The fourth test solution (solution 4 below) was prepared by dissolving all of the remaining solid material in distilled water, filtering, and diluting the filtrate to 50 ml. with water. The four solutions were analyzed for zirconium, aluminum and chlorine, and the following results obtained:

| Solution analyzed | Atomic ratio | | |
|---|---|---|---|
| | Zr: | Al: | Cl: |
| 1 | 1 | 2.12 | 1.85 |
| 2 | 1 | 2.22 | 2.89 |
| 3 | 1 | 2.10 | 2.08 |
| 4 | 1 | 2.07 | 1.98 |

The results indicate that a compound was formed which yields solutions of the same relative composition when either all or a fraction of the dry material is dissolved in water. While a slight discrepancy from the theoretical values is noted in solution 2, this is probably due to the extremely diluted solution, since there was only 1–2 mg. of each component per ml.

Analyses were also performed on solutions made from the material of Example II (trichloro monohydroxy dialuminum zirconate). The material as prepared by the steps described in this example was dried in a vacuum desiccator over calcium chloride for three days, and the solution thus obtained was leached with insufficient water to dissolve the material completely. The remaining solid was then dissolved, and the two solutions were analyzed for aluminum, chlorine and zirconium. The following table sets forth the results obtained:

| Solution analyzed | Milligram-moles ml. | | | Atomic ratio | | |
|---|---|---|---|---|---|---|
| | Al | Cl | Zr | Zr: | Al: | Cl: |
| Leach | 0.807 | 1.21 | 0.423 | 1 | 1.91 | 2.86 |
| Residue | 1.50 | 2.30 | 0.785 | 1 | 1.91 | 2.93 |

The results in the foregoing table show that, within experimental error, the solutions have the three elements in identical molar ratios and therefore a compound of constant composition existed.

Constant solubility determination was also made for the compound tetrachloro dialuminum zirconate. Four solutions were prepared in generally the manner followed with the compound dichloro dihydroxy dialuminum zirconate, the first solution (solution A below) being prepared by dissolving 2 grams of dried material in water and diluting to 100 ml. with water. The second solution (solution B below) was prepared by treating 20 grams of dried material with 15 ml. of distilled water for three minutes, and separating the solutions from the undissolved solids by decantation. The solution was diluted to 50 ml. with distilled water. The third solution (solution C below) was made by adding 10 ml. of distilled water to the undissolved solids of solution B, and separating the solution by decantation. The solution was then diluted to 50 ml. with distilled water. The fourth solution (solution D below) was prepared by dissolving the remaining solid material in distilled water and diluting to 50 ml. with water.

The following results were obtained:

| Solution analyzed | Atomic ratio | | |
|---|---|---|---|
| | Zr: | Al: | Cl: |
| A | 1 | 1.89 | 3.83 |
| B | 1 | 1.89 | 3.85 |
| C | 1 | 1.73 | 3.64 |
| D | 1 | 1.71 | 3.56 |

It is again shown from these analyses that a compound has been formed which yields solutions of the same relative composition when either all or a fraction of the dry material is dissolved in water.

Formula weight determinations have also been made on the new compound trichloro monohydroxy dialuminum zirconate. The following procedure was used. A 25 ml. portion of the solution made by the method of Example II was dried to a glassy solid at 35 to 40° C., and was then placed in a vacuum desiccator over phosphorus penoxide until the weight became constant. The dried material was weighed accurately, dissolved in water, and diluted to a known volume. All of the material was soluble, and the temperature rose noticeably when the water was added to the solid. The solution was analyzed for the three elements, and the formula weight calculated from each analysis and compared with an empirical formula calculated from the percentages of the elements, assuming the remainder of the elements to be oxygen and hydrogen.

From this analysis, it was determined that the atomic ratio of the zirconium to aluminum to chlorine in the compound was 1 to 1.99 to 2.94. The average formula weight was found to be 448, which indicated that the compound was in the form of its heptahydrate having the formula $ZrO.(AlO)_2.Cl_3(OH).7H_2O$. This compound has a formula weight of 442.7, which is in good agreement with the experimentally obtained formula weight of 448.

The physical properties of the new compound trichloro monohydroxy dialuminum zirconate have been carefully compared with the physical properties of a simple mixture of aluminum chlorhydroxide and zirconium oxychloride. A 10% by weight water solution of aluminum chlorhydroxide was mixed with an equal volume of a 10% by weight solution of zirconium oxychloride. The pH of the solutions before mixing were 4.45 and 0.91, respectively. Immediately after mixing, the pH of the resulting solutions was 1.55. The mixture was divided in half and the first half portion was allowed to stand at room temperature. The pH was determined at half hour intervals for five hours, after standing over night, and at the end of 29 hours. During this time, the solution became an opalescent gel and the pH rose to 3.29. After standing for several days, the gel separated from a liquid phase. Investigations indicate that the gel is a compound having the probable formula $ZrO_2.xH_2O$.

The second half portion was boiled and cooled immediately. The solution gelled during the heating before reaching the boiling point, and the gel broke up into a thick slurry. The pH of the cooled mixture was 3.11, and 29 hours after the original mixing, the pH was 3.31. One month later, the mixture was still a gel but some syneresis had taken place.

From these tests, it is readily apparent that the physical properties of the simple mixture of aluminum chlorhydroxide and zirconium oxychloride bore very little resemblance to the physical properties of the compounds produced in accordance with this invention. Thus, this simple mixture produces in all probability $ZrO_2.xH_2O$ and an aluminum hydroxychloride, whereas by applicant's method of reacting $ZrO.Cl_2$ and an aluminum alkoxide, a single compound of zirconium, aluminum and chlorine is formed which is viscous or essentially gel-free. Further, in antiperspirant applications, the compounds herein disclosed have been found to be at least as effective as the simple mixture of aluminum chlorhydroxide and zirconium oxychloride, when used with an equal Zr—Al content.

Numerous tests have further been made to establish the antiperspirant effectiveness of the chloro-dialuminum zirconates of this invention. In general, the procedure followed was to seat each subject with her hands in basins of water maintained at 41–43° C., and with a pad of Webril sheet in each axilla. (Webril is a felted sheet of cellulose fiber, having a thickness comparable to blotting paper. The pad used is a piece 4½ x 6½ inches folded twice in half.) The room temperature was maintained at 80–85° F., and after 50 minutes, the Webril pads were removed and the axillae of each subject wiped with a towel. A tared Webril pad was then inserted in each axilla, the pads removed after 20 minutes, and then weighed to determine the weight of sweat collected. The ratio of sweat collected in the axilla treated or to be treated to the sweat collected in the other axilla was then calculated.

A 3-inch gauze sponge was moistened with a composition in the concentrations to be later stated, and applied liberally to one axilla of each subject. The subject was then allowed to relay for an hour in a room maintained at 72–75° F., and the sweat output ratio determined as above, the sweat being collected on a tared Webril pad. In the tables below, the "adjusted ratio" is calculated by dividing the test ratio by the average control ratio value. Percent reduction in sweat production=100 (1-adjusted ratio). The subjects used no antiperspirants, other than compositions employing the compounds of this invention, during the test period and for a week prior to its start.

In the tabulation below of the result obtained samples A, B and C were 10% tetrachloro dihydroxy, dichloro monohydroxy, and trichloro dialuminum zirconate, respectively, in 20% isopropanol.

| Sample | After 3 applications adjusted ratio | | Percent reduction, average |
|---|---|---|---|
| | Average | Range | |
| A | 0.676 | 0.380–0.887 | 32.4 |
| B | 0.735 | 0.591–1.209 | 26.5 |
| C | 0.492 | 0.200–1.119 | 50.8 |

It may be seen from the foregoing results that the compounds of this invention when used as the active ingredient in antiperspirant compositions demonstrate an effectiveness at least comparable to known compositions using buffering agents. Such agents, as noted, materially increase the cost of the product, and as has also been noted, an effectiveness of the order of twice as great is found with the present compounds when compared with a simple mixture of aluminum chlorhydroxide and zirconium oxychloride, on an equal weight basis.

The improved compounds of the present invention can be used as a liquid product, such as in water or in solution in an organic solvent at concentrations ranging from about 1 gram to 20 grams per 100 ml. of solvent. The desirable concentration is a 10% (w./v.) solution in water, as earlier illustrated by 10.0 g. of the material in 100 ml. of water. The final product may contain coloring and or perfuming material if desired.

The improved compounds of this invention for antiperspirant applications may be combined into a suitable cream, lotion or spray. For example, the active ingredient may be combined with gum tragacanth, petrolatum, glyceryl monoesters such as glyceryl monolaurate, glyceryl monostearate, and the like. Generally, suitable antiperspirant compositions are provided by combining from 1 to 10 parts by weight of the active ingredient with 10 parts by weight of the carrier.

It will be understood that various changes and modifications may be made in the described embodiment without departing from the scope of the present invention.

I claim as my invention:

1. The method of preparing a chloro-dialuminum zirconate compound having the generic formula:

$$ZrO.(AlO)_2.Cl_2X_2$$

wherein each X is a monovalent radical selected from the group consisting of —Cl and —OH radicals, which comprises the steps, in an aqueous type medium, of reacting one mole of zirconium oxychloride and two moles of an aluminum alkoxide having a $C_1$ to $C_5$ alkyl group, incorporating in said medium a sufficient proportion of added hydrochloric acid when the desired compound having the above generic formula contains more than 2 —Cl radicals, to form the desired compound, and recovering said compound.

2. The method of claim 1 which includes the added step of distilling off the alcohol resulting from the reaction to obtain an aqueous solution of said compound, said desired compound having when in a 10% (w./v.) solution a pH of not less than about 3.3.

3. The method of claim 1, in which the desired compound is dichloro-dihydroxy dialuminum zirconate and no hydrochloric acid is added.

4. The method of claim 1, in which the desired compound is tetrachloro-dialuminum zirconate and the sufficient proportion of reactive chloride ions is furnished by added hydrochloric acid.

5. The method of preparing a chloro-dialuminum zirconate compound having the generic formula:

$$ZrO.(AlO)_2.Cl_2X_2$$

wherein each X is a monovalent radical selected from the group consisting of —Cl and —OH radicals, which comprises the steps of dispersing zirconium oxychloride in water, adding a sufficient proportion of hydrochloric acid when the desired compound having the above generic formula contains more than 2 —Cl radicals to form said desired compound, adding at least a sufficient proportion of an aluminum alkoxide having a $C_1$ to $C_5$ alkyl group to form said desired compound, and distilling off the resulting alcohol formed to obtain an aqueous solution of said desired compound, said compound upon dilution to a 10% (w./v.) solution giving a pH of not less than about 3.3.

6. The method of claim 5, in which the desired compound is trichloro-monohydroxy dialuminum zirconate and the sufficient proportion of reactive chloride ions is furnished by added hydrochloric acid.

7. The method of claim 5, in which the desired compound is dichloro-dihydroxy dialuminum zirconate and no hydrochloric acid is added.

8. The method of claim 5, in which the desired compound is tetrachloro-dialuminum zirconate and the sufficient proportion of reactive chloride ions is furnished by added hydrochloric acid.

9. A chloro-dialuminum zirconate compound having the generic formula:

$$ZrO.(AlO)_2.Cl_2X_2$$

wherein each X is a monovalent radical selected from the group consisting of —Cl and —OH radicals, said compound as formed having in a 10% (w./v.) aqueous solution a pH of not less than 3.3.

10. A chloro-dialuminum zirconate compound defined by claim 9 having the specific formula:

$$ZrO.(AlO)_2Cl_2(OH)_2$$

a 10% (w./v.) aqueous solution of which has a pH of about 3.65.

11. A chloro-dialuminum zirconate compound defined by claim 9 having the specific formula:

$$ZrO.(AlO)_2.Cl_3(OH)$$

a 10% (w./v.) aqueous solution of which has a pH of about 3.50.

12. A tetrachloro-dialuminum zirconate compound defined by claim 9 having the specific formula:

$$ZrO.(AlO)_2.Cl_4$$

a 10% (w./v) aqueous solution of which has a pH of about 3.30.

References Cited in the file of this patent

UNITED STATES PATENTS 2,906,668    Beekman _____ Sept. 29, 1959

OTHER REFERENCES

Helton et al.: American Perfumer and Aromatics, page 50, January 1957.